(12) United States Patent
Falk et al.

(10) Patent No.: US 7,739,292 B2
(45) Date of Patent: Jun. 15, 2010

(54) SYSTEM AND METHOD FOR MODELING AND MANAGING ENTERPRISE ARCHITECTURE DATA AND CONTENT MODELS AND THEIR RELATIONSHIPS

(75) Inventors: Alexander Falk, Marblehead, MA (US); Vladislav Gavrielov, Vienna (AT)

(73) Assignee: Altova GmbH, Vienna (AT)

( * ) Notice: Subject to any disclaimer, the term of this patent is extended or adjusted under 35 U.S.C. 154(b) by 345 days.

(21) Appl. No.: 11/237,988

(22) Filed: Sep. 28, 2005

(65) Prior Publication Data

US 2007/0073712 A1    Mar. 29, 2007

(51) Int. Cl.
   G06F 17/30    (2006.01)
(52) U.S. Cl. ................................ 707/760; 707/E17.123
(58) Field of Classification Search ................. 707/601, 707/604, 760, 803, 809, E17.123, E17.127
   See application file for complete search history.

(56) References Cited

U.S. PATENT DOCUMENTS

| | | | |
|---|---|---|---|
| 6,529,909 B1 | 3/2003 | Bowman-Amuah | |
| 6,549,949 B1 | 4/2003 | Bowman-Amuah | |
| 6,615,253 B1 * | 9/2003 | Bowman-Amuah | 709/219 |
| 6,636,242 B2 | 10/2003 | Bowman-Amuah | |
| 6,873,984 B1 * | 3/2005 | Campos et al. | 707/6 |
| 7,054,877 B2 | 5/2006 | Dettinger et al. | |
| 7,139,774 B2 * | 11/2006 | Dettinger et al. | 707/103 R |
| 7,287,039 B2 * | 10/2007 | Rajan et al. | 707/103 R |
| 7,401,075 B2 * | 7/2008 | Vincent, III | 1/1 |
| 2005/0075996 A1 | 4/2005 | Dettinger et al. | |

OTHER PUBLICATIONS

Roy et al., XML Schema Language: Taking XML to the Next Level, IT Professional vol. 3, Issue 2, Mar.-Apr. 2001, pp. 37-40.*

* cited by examiner

Primary Examiner—Fred I Ehichioya
(74) Attorney, Agent, or Firm—Kenneth F. Kozik (57) ABSTRACT

A distributed system includes client- and server-side components that, together, allow XML schemas or the like to be managed in a collaborative way across an enterprise environment. The server-side component, or server, is used to assemble a collection of one or more schemas. The server exposes the collection of schemas to one or more client components that connect to the server. Such connections may be made over a computer network. The client component preferably exports a display interface through which a user can visualize dependencies between schemas, e.g., by dragging them into a workspace and viewing all related schemas and how they are connected, as well as what elements and other components they define. In this way, the client component provides a high-level view of a larger (e.g., enterprise-wide) information architecture.

16 Claims, 7 Drawing Sheets

SYSTEM AND METHOD FOR MODELING AND MANAGING ENTERPRISE ARCHITECTURE DATA AND CONTENT MODELS AND THEIR RELATIONSHIPS

COPYRIGHT NOTICE

This application includes subject matter protected by copyright. All rights are reserved.

BACKGROUND OF THE INVENTION

1. Technical Field

The present invention relates generally to the modeling and management of enterprise architecture data, such as XML schemas and other content models.

2. Description of the Related Art

The W3C XML Schema Definition Language is an XML language for describing and constraining the content of XML documents. XML Schema was published in 2001 as a Recommendation from the W3C, and it has become widely adopted. A schema defines a class of XML documents. One of the most powerful aspects of the XML Schema standard is the ability to construct complex schemas of multiple, smaller schemas. This modular approach to schema design promotes the development of schema components upon which organizations can standardize to increase consistency and reduce redundant development efforts. Despite these advantages, the process of managing complex schemas that consist of multiple interdependent files can be confusing and error-prone, especially in team environments where multiple users manage schema development.

It is known in the prior art to provide graphical schema editors, however, such tools typically only provide a view of actual schema components within the workspace local to the editor itself. Schema repositories, which are designed to facilitate document versioning and centralization, are also known in the art. These repositories, however, do not provide techniques that enable workgroups to model and/or manage the schemas across the enterprise, and they do not provide users with the ability to view and manage schema relationships or to construct complex schemas from smaller building blocks.

The present invention addresses the deficiencies in the art.

BRIEF SUMMARY OF THE INVENTION

It is a general object of the invention to provide computer-implemented methods and systems to assist developers and information architects to visualize, combine, and control data schemas in an intuitive, standards-conformant, manner.

It is another general object of the present invention to provide a tool for modeling and management of enterprise architectural data and content models, such as XML schemas.

It is a more specific object of the invention to provide a graphical tool to enable workgroup members to visualize schema connections and to manage schema relationships, preferably in a distributed manner.

It is still another object of the invention to provide a graphical interface tool to enable information architects and others to create visual schema designs for organizing and managing schema collections.

Another object of the invention is to provide a tool to enable users to manage multiple schemas as schema components in a graphical workspace.

A more specific object of the invention is to provide a client/server-based system that exposes a graphical user interface through which a collection of schemas can be viewed as a pool of resources that can be easily re-used and interconnected to reduce schema development times.

A still further object of the invention is to provide a tool to propagate changes made in one schema to one or more other schemas that reference the schema in a workspace.

A further more specific object of the invention is to provide a tool to automatically create, update or delete include, import or redefine (IIR) references between schemas.

Another object of the invention is to enable client server-based schema modeling and management, where the client is a legacy XML editor.

Yet another object of the invention is to provide a client-side graphical user interface (GUI) to a client-server schema repository.

In an illustrative embodiment, the present invention is a system that comprises client- and server-side components (typically software) that allow XML schemas (by way of example only) to be managed in a collaborative way. The server-side component, or server, is used to assemble a collection of one or more schemas. The server exposes the collection of schemas to one or more client components that connect to the server. Such connections may be made over a computer network. The client component preferably exports a display interface through which a user can visualize dependencies between schemas, e.g., by dragging them into a workspace and viewing all related schemas and how they are connected, as well as what elements and other components they define. In this way, the client component provides a high-level view of a larger (e.g., enterprise-wide) information architecture, as opposed to a low-level view of actual schema components that may be exposed by prior art graphical schema editors.

Information architects and others in the enterprise use the client server-based visual tool as a development environment to model and manage complex XML schemas and their components. In a typical operation, the server component connects one or more workgroup users to all of the XML schemas available in the enterprise, e.g., in an XML-enabled database, which promotes a collaborative environment on top of the schema repository. This enables developers to work together on schema development and to share modular schemas as standardized components for reuse in composite schema designs.

The foregoing has outlined some of the more pertinent features of the invention. These features should be construed to be merely illustrative. Many other beneficial results can be attained by applying the disclosed invention in a different manner or by modifying the invention as will be described.

DETAILED DESCRIPTION

Figure 1:
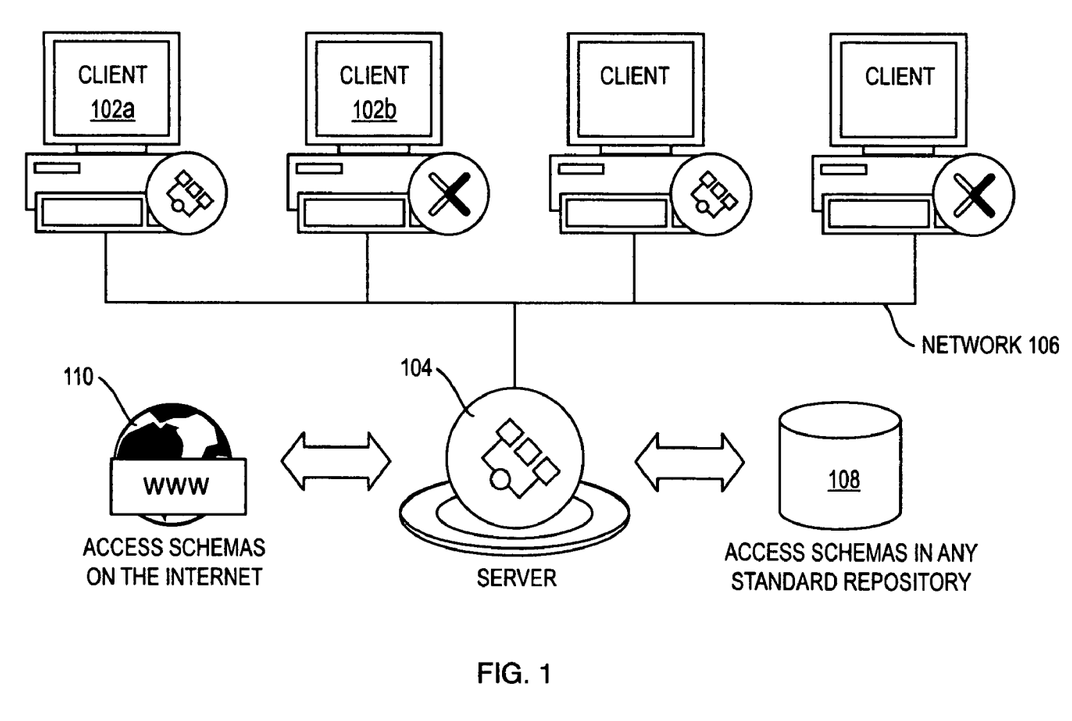
FIG. 1 illustrates an implementation of the present invention within a distributed enterprise environment.

The following description assumes familiarity with XML Schema and related XML technologies, which are well-known in the art. For purposes of illustration, the present invention is described and shown as being implemented in a distributed computer environment within a given enterprise, although this should not be construed as a limitation. As illustrated in FIG. 1, the present invention is a distributed system comprising client- and server-side components that, together, allow XML schemas or the like to be managed in a collaborative way, preferably across an enterprise environment. In particular, the invention may be implemented as a graphical client/server schema administration tool that allows a given user to view a collection of schemas as a pool of resources. In the FIG. 1 embodiment, the server-side component, or server 104, is used to assemble a collection of schemas. A given schema may be created by a given user; thus, the collection of schemas typically represents the efforts of one or more users of the tool. The server 104 exposes the collection of schemas to one or more client components 102*a-n* that connect to the server 104. Such connections may be made over a computer network 106. The computer network 106 may be a local area network (LAN), wide area network (WAN), or the like. The server 104 accesses one or more schemas from a repository 108, such as an XML-enabled database, or over the Internet 110. As will be described, the client component preferably exports a display interface through which a user can visualize dependencies between schemas, e.g., by dragging them into a workspace and viewing all related schemas and how they are connected, as well as what elements and other components they define. In this way, the client component provides a high-level view of a larger (e.g., enterprise-wide) information architecture.

As illustrated in FIG. 1, the "client" component of the client-server schema modeling and management tool of the present invention may be implemented as a standalone or distinct code module (computer 102*a*), or integrated with or as an adjunct to an existing XML schema editor (computer 102*b*). An example of the latter would be a known graphical XML schema editor, such as XMLSpy®, which is available commercially from Altova GmbH.

More generally, the invention is implemented within the context of a distributed computing environment that includes a set of computing-related entities (systems, machines, processes, programs, libraries, functions, or the like) that facilitate or provide the described functionality. Preferably, and as noted above, the environment exists within an enterprise, which may have one or more distributed locations. The client-server architecture of the invention may also be implemented across cooperating enterprise environments, e.g., as an extranet application. A representative machine on which a component of the invention executes is a client workstation or a network-based server running commodity (e.g., Pentium-class) hardware, an operating system (e.g., Windows XP, Linux, OS-X, or the like), optionally an application runtime environment, and a set of applications or processes (e.g., native code, linkable libraries, execution threads, applets, servlets, or the like, depending on platform) that provide the functionality of a given system or subsystem. Conventional network-based access protocols and techniques (e.g., HTTP, SOAP, Web services, RPC, and the like) are used. The method may be implemented as a standalone product, or as a managed service offering. As noted above, the method may be implemented at a single site, or across a set of locations. Of course, any other hardware, software, systems, devices and the like may be used. More generally, the present invention may be implemented with any collection of autonomous computers (together with their associated software, systems, protocols and techniques) linked by a network or networks. All such systems, methods and techniques are within the scope of the present invention.

Figure 2:
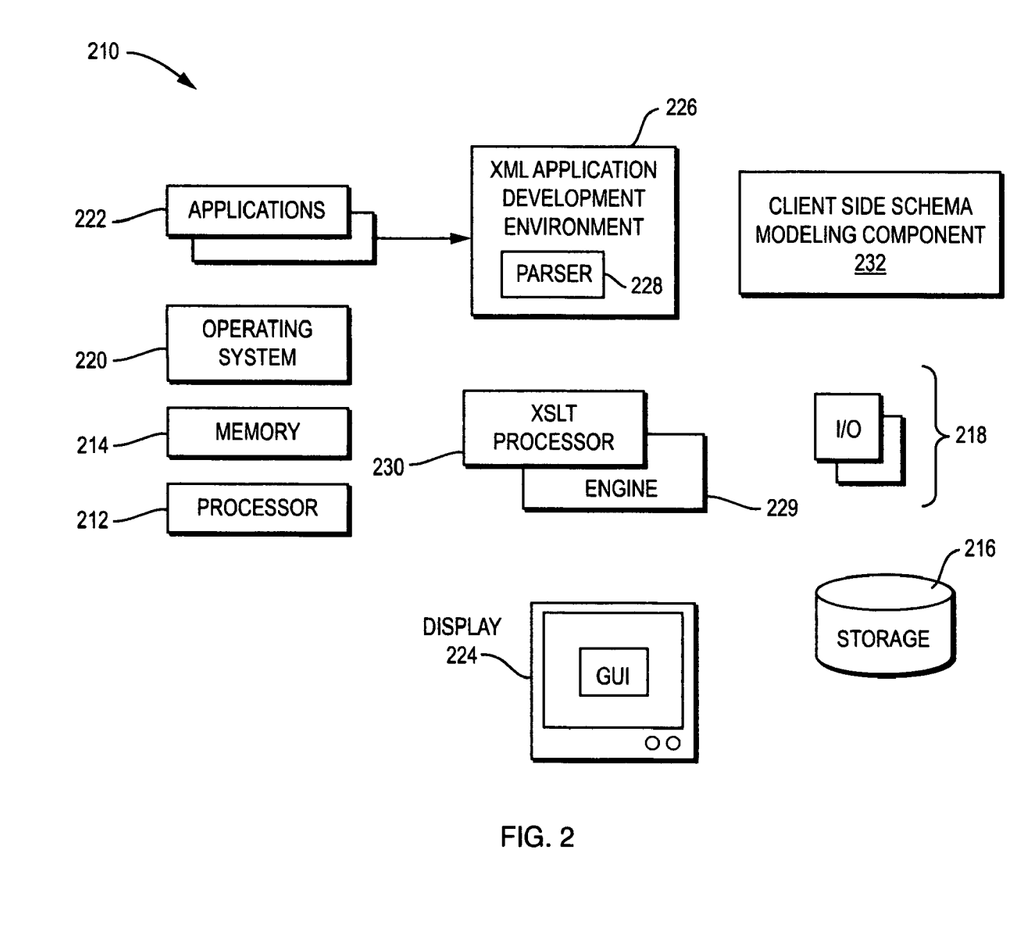
FIG. 2 illustrates a data processing system in which a client component of the present invention is implemented.

A representative client computer 102*a-n* is implemented in a data processing system such as shown in FIG. 2. Typically, a data processing system 210 is a computer having one or more processors 212, suitable memory 214 and storage devices 216, input/output devices 218, an operating system 220, and one or more applications 222. One input device is a display 224 that supports a window-based graphical user interface (GUI). The data processing system 210 includes suitable hardware and software components (not shown) to facilitate connectivity of the machine to a computer network. In a representative embodiment, the data processing system 210 is a Pentium-based computer executing a suitable operating system such as Windows 98, NT, W2K, or XP. Of course, other processor 212 and operating system 220 platforms may also be used. As noted above, the data processing system 210 may include an XML application development environment 226, such as XMLSpy® from Altova, GmbH. An XML development environment 226 such as Altova® XMLSpy® facilitates the design, editing and debugging of enterprise-class applications involving XML, XML Schema, XSL/XSLT, and related technologies. The XML development environment 226 typically includes or has associated therewith ancillary technology components such as: an XML parser 228, an interpreter engine 229, and an XSLT processor 230. These components may be provided as native applications within the XML development environment 226 or as downloadable components. When the present invention is implemented in such an environment, the XML development environment 226 also includes a client modeling component 232 for exposing a graphical user interface, which is now described.

Figure 3:
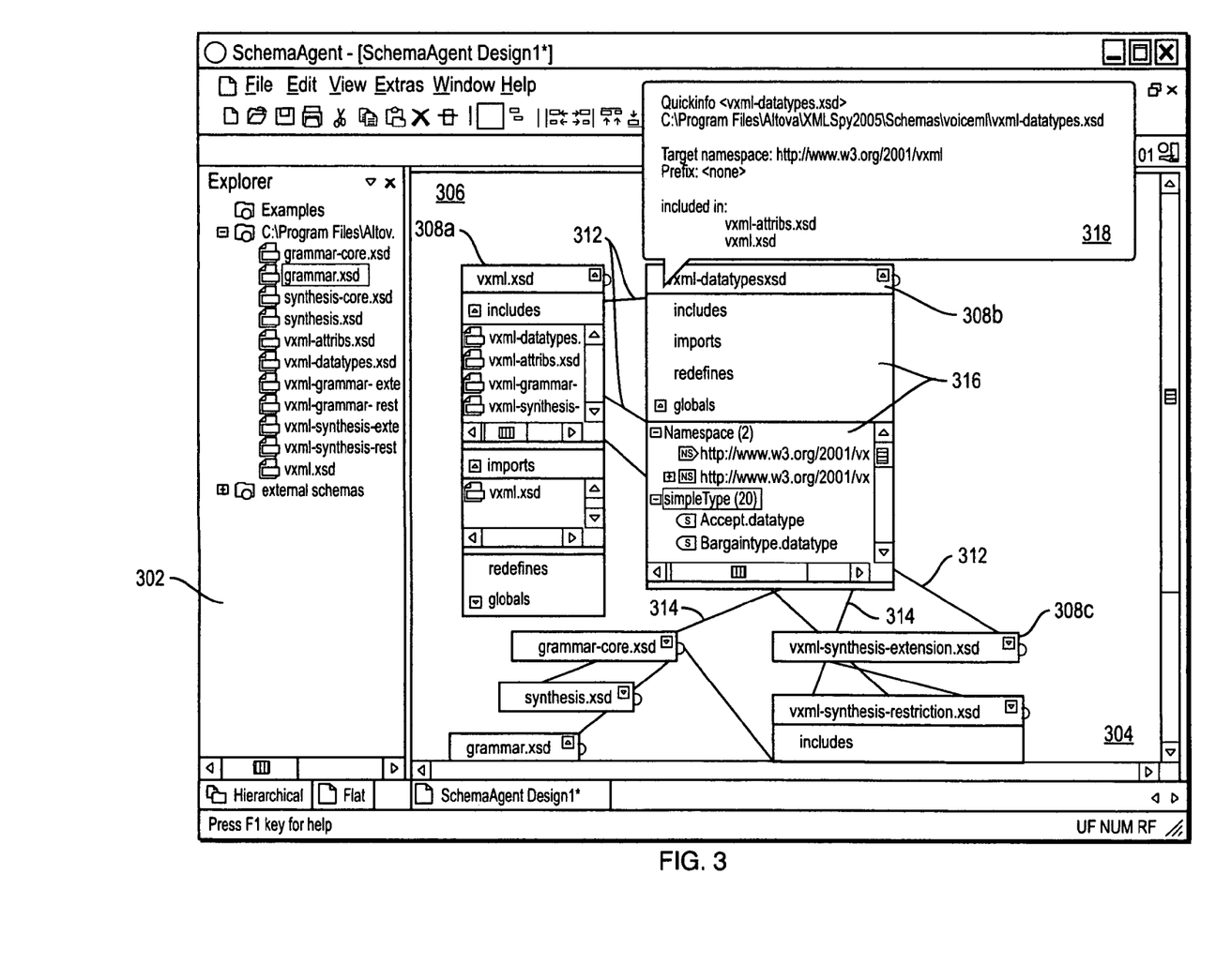
FIG. 3 illustrates a representative client component GUI according to an embodiment of the present invention

According to the present invention, the client component 232 provides an enduser access to schemas in one or more enterprise repositories accessible, for example, via the server component. Preferably, the client component uses standard GUI mechanisms, such as copy-and paste and drag-and-drop, to enable an end user to build relationships between these schemas and to make small or large-scale changes, e.g., such as in path references, across multiple schemas. Referring to FIG. 3, the client component GUI 300 preferably has two main display areas, an explorer pane 302 and a design pane 304. The explorer pane 302 preferably displays all schemas available in all search paths defined for the selected server (i.e., the server component of the present invention). As illustrated, preferably the folders are ordered alphabetically and, within each folder, schemas are ordered alphabetically. In a hierarchical tab 306, schemas preferably are displayed in a tree structure; in a flat tab 308, schemas preferably are displayed as a flat list, together with the location of the schemas and their status. As illustrated, the GUI 300 also has standard Windows GUI features such as a menu bar 310, toolbars 312, and a status bar 314. The menu bar 310 contains the various client component menus that provide access to application commands in the usual manner. In the explorer pane 302, an end user can create a new schema or folder, rename schemas and folders, delete schemas and folders, move schemas and folders to other positions under each path entry, and recreate schemas. Each of these actions is applied to the affected schema files automatically and propagated throughout the workspace as necessary. Thus, for example, and as will be described in more detail below, actions that affect schemas across the enterprise (preferably automatically) include renaming and deleting, as well as IIR changes (includes, imports, redefines) that affect any schema referencing the schema changed at the client-side location. If desired, the client component may delay the propagation (or require a validation beforehand) before the action is taken. Alternatively, an undo command function may be implemented within the component. In the preferred embodiment, however, when the state of a schema or folder (e.g., its name or state of existence) is changed, all IIRs of any schemas referencing it (across the enterprise) are automatically updated, preferably immediately. If the client computer is off-line, however, the propagation may occur when the computer connects back into the network.

The design pane 304 contains one or more design tabs 306. A design tab graphically displays schemas dragged into the tab from the explorer pane 302 and shows existing IIRs. As can be seen in this example, the design pane 304 displays a visual representation of a set of schemas 308a-n and their inter-relationships. Thus, according to a preferred embodiment, the end user drags folders or individual schemas from the explorer pane 302 onto the design tab 306, and relationships that exist between the schemas are then displayed automatically, preferably with colored lines: import references are indicated by a first color (e.g., blue) line 320, includes are indicated by a second color (e.g., green) line 322, and redefines are indicated by a third color (e.g., purple) line 324. In addition, selection of a menu (e.g., by a right click on the schema title bar) allows the user to select any schema placed in the design pane 304 and to automatically insert all referenced schemas, directly referenced schemas, or linked schemas. A user can create IIR relationships using drag-and-drop. When the user moves a cursor over the title bar of a schema box in the design tab 306, preferably a quick information box 318 appears that contains information about the location of the schema, its namespaces, and its IIRs. The designs created in the design tab 306 can be saved individually; when a design is saved, preferably it is also exported to the server component for central or other storage, e.g., in a repository, a remote store, or the like. This enables a user at a client computer (whether this computer or some other machine in the enterprise) to manage groups or collections of schemas. An individual design can be subsequently re-opened or edited by any client component, as has been described, to facilitate collaborative editing and linking of schemas by enterprise tool users. As the schemas are positioned or re-positioned on the design tab 306, the relationship indicator lines are automatically re-positioned or moved as necessary. In addition, the user can resize schema boxes by dragging box borders, can expand and minimize schema boxes by clicking the arrowheads in the title bar, and can expand and collapse trees within schema boxes by clicking the plus and minus symbols.

Preferably, and as illustrated in FIG. 3, each schema is displayed as a box, which can be expanded or minimized. When schemas are inserted into a design, preferably they are inserted as minimized schema boxes. A schema box can then be expanded by clicking an arrowhead in the title bar. The components of the schema box can be further expanded by expanding the components, and then expanding the tree structure of the IIRs and global components. As has been illustrated, preferably the schema box displays IIRs graphically as well as a list of all global components of the schema. IIRs between schemas in a design tab are graphically displayed by means of connector lines between schema boxes. Preferably, colors are used to indicate the IIR type, although this is not a requirement. When the user places a cursor over a connector line, preferably the line is highlighted and an arrowhead appears that indicates the "direction" of the relationship. As noted above, preferably any IIR relationship created in a design is propagated immediately to the respective files as soon as the relationship is created.

In a design tab one or more schemas can be selected at a time. Preferably, only one of all selected schemas has focus on the GUI. This single focus constraint is beneficial because some actions, such as aligning, require that one or more selected schemas be positioned in a given way with respect to the schema that has the focus. To select a schema in the design tab, the user can click anywhere inside the schema box. When this occurs, preferably the title bar of the selected schema becomes highlighted to emphasize the focus. To select multiple schemas in a design tab, the user can click the schema boxes while holding down a control key, or alternatively by clicking and dragging a box around a set of schema boxes.

Figure 4:
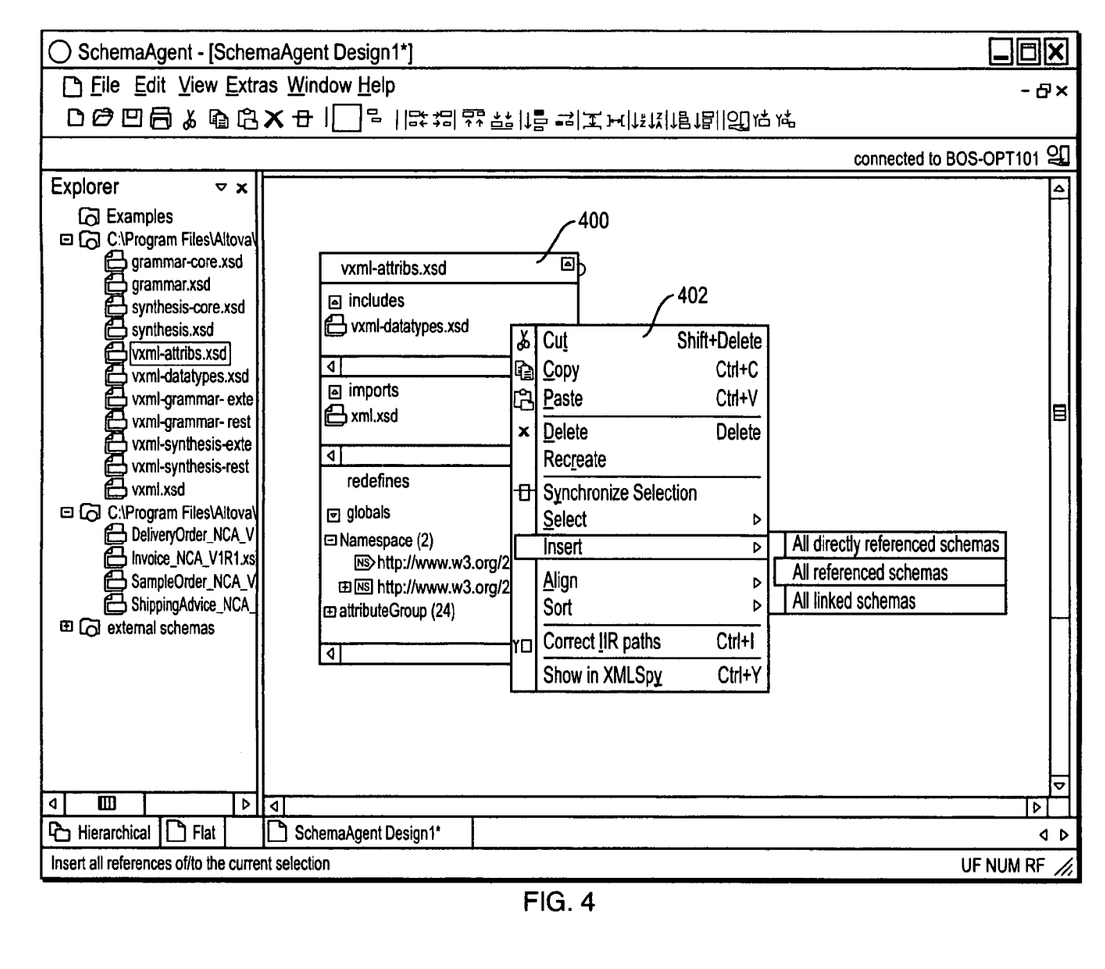
FIG. 4 illustrates the client component GUI control that provides the user the ability to automatically insert all referenced schemas, directly referenced schemas, or linked schemas.

As illustrated in FIG. 4, an end user can right click on a schema box 400 and, as a result, obtain a menu 402 that provides the user the ability to automatically insert all referenced schemas, directly referenced schemas, or linked schemas. Typically, a schema can have three types of related schemas. Directly referenced schemas, as the name implies, are those that are directly referenced with an IIR statement. For example, if schema A has an Include statement that references schema B, then B is directly referenced by A. Referenced schemas are those that are directly as well as indirectly referenced. For example, if schema A has an Include statement that references schema B, and schema B has an Include statement that references schema C, then B is directly referenced by A, C is directly referenced by B, and C is indirectly referenced by A. Linked schemas are those that are directly or indirectly referenced, as well as those that are linked to any of the directly or indirectly referenced schemas. Related schemas are used in several ways. As also illustrated in FIG. 4, the menu 402 also provides a Synchronize selection command. Synchronized selection refers to the selection of a schema in both tabs of the explorer pane and in the currently-selected design tab of the design pane (here there is only one shown). This command causes the schema selected to be selected in the other, non-active view. This causes the currently selected schema to be selected for as well in other, non-active views. A similar command is also available in the explorer pane.

Figure 5:
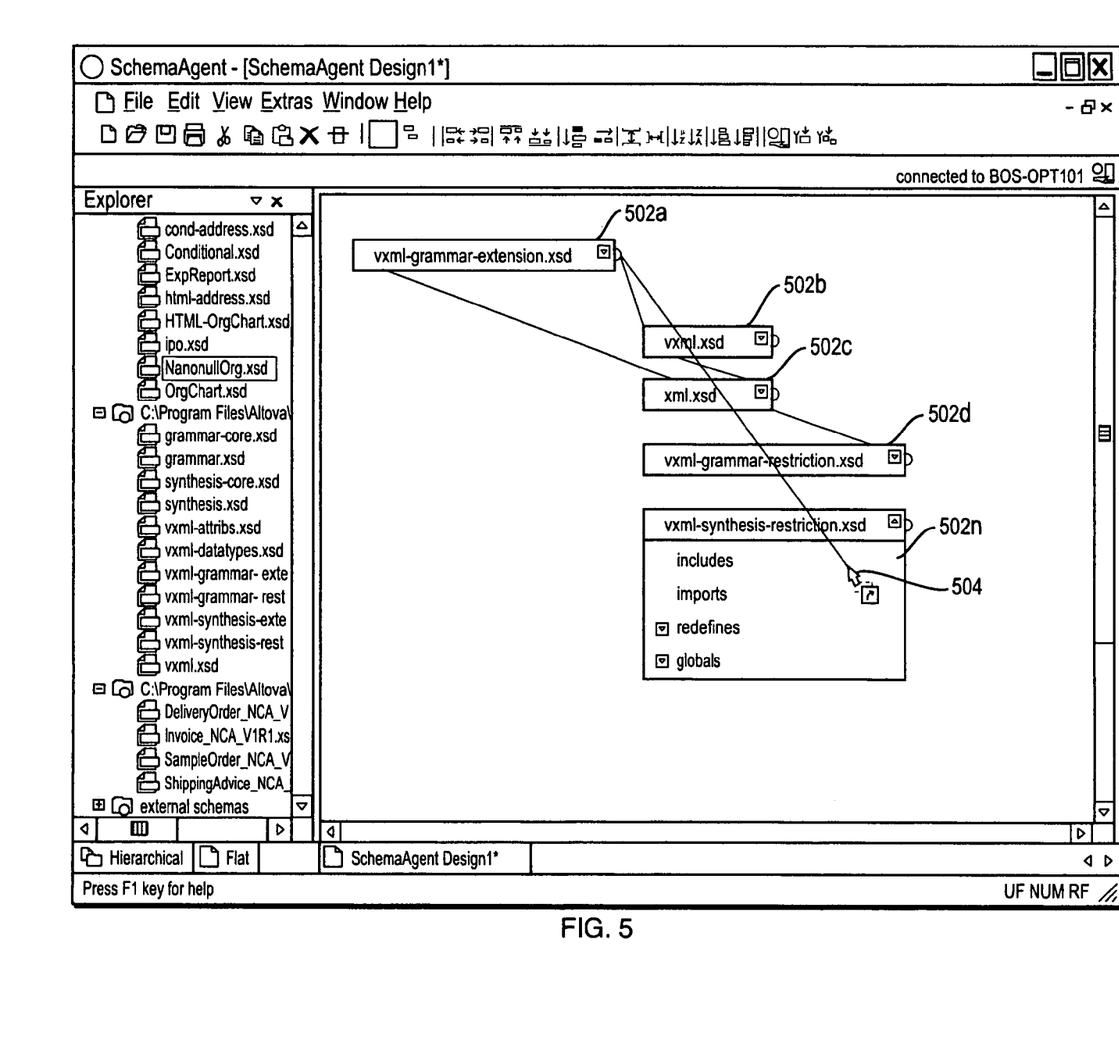
FIG. 5 illustrates the client component GUI control that provides the user the ability to create include/import/redefine (IIR) relationships among a set of schemas by dropping and dragging connecting lines.

As illustrated in FIG. 5, the user can create include/import/redefine (IIR) relationships among a set of schemas 502a-n by dropping and dragging one or more connecting lines 504 between schemas. Imports, includes and redefines are known XML Schema methods that can be used to modularize schemas. Each method has a specific namespace requirement, which is automatically checked by the tool when an IIR is created. Imports are used when combining schema components that belong to different namespaces. Using Imports defines the schema location, as well as the namespace for the schema. This allows the document instance to contain both namespaces. Includes are used to incorporate schema components that belong to the same target namespace or that do not have a target namespace. Redefines are used to combine and modify schema components of the same target namespace or that do not have a target namespace. Using Redefines allows the designer to incorporate external schema definitions and declarations, and to change them in the redefining schema. As noted above, preferably the client or server component automatically checks namespaces as the user attempts to create an IIR relationship. This ensures that no invalid IIR statement is created in the target schema.

In use, schemas are inserted into a design from the explorer pane or by inserting schemas related to the selection in the design tab. To insert a schema or schemas, the user selects a schema or a folder containing schemas and drags the selection into the design pane. Alternatively, the user can right-click the schema or folder in the explorer pane and obtain a popup menu from which an insert function can be initiated. If a schema is left-dragged into a design tab, the schema is inserted into the design; if a folder is left-dragged into the design tab, preferably all the schemas in the folder are inserted into the design. If a schema or folder is right-dragged into the design tab, preferably a popup window or submenu appears asking whether the user desires to insert only the selected schema or folder schemas, or whether related schemas should also be inserted. As noted above with respect to FIG. 4, when one or more schemas are selected in a design, related schemas can be inserted into the design as well. A schema can be selected (by clicking on the box) and then deleted using a delete option. The schema boxes in a design can be aligned, which helps provide the design with a cleaner visual appearance. Schema boxes can be aligned on a background grid or relative to the schema box that has the focus. To align schema boxes, the boxes to be aligned are first selected, and then an alignment option is then selected from a context menu. Various options (on grid, edges, line up, space evenly, or the like) are then presented for selection. In addition, the schema boxes can be sorted, e.g., in alphabetical order, according to their widths, in ascending or descending order, or the like.

Thus, the design pane supports one or more design tabs. Within a given design tab, a user graphically creates and manages the relationships between n-number of enterprise content models, such as W3C-compliant XML Schemas. The resulting design is a visual representation of one form of information architecture, e.g., a set of schemas whose relationships may be altered by one or more connected client components. In this manner, one or more users can organize schemas into collections of related schemas. A design can be saved for editing at a later time by the original author or any other connected user. If desired, a given authentication, authorization or access control (or set) may be applied with respect to a particular schema, schema folder, or design.

As noted above, the client component may be a standalone component or an adjunct to an existing XML schema editor, such as Altova XMLSpy®, which have native schema editing functions. According to the invention, one or more client components are connected or connectable to a server component. The server component may be a single server (or server process instance), or a set of servers (or server process instances). The "server" component refers to any particular implementation. The server enables one or more client components to access all schemas defined in the search paths defined for the server for which the client(s) are connected. The ability to access components of multiple schemas and to reuse them in the schema being currently created or edited considerably simplifies the building of complex schemas.

Figure 6:
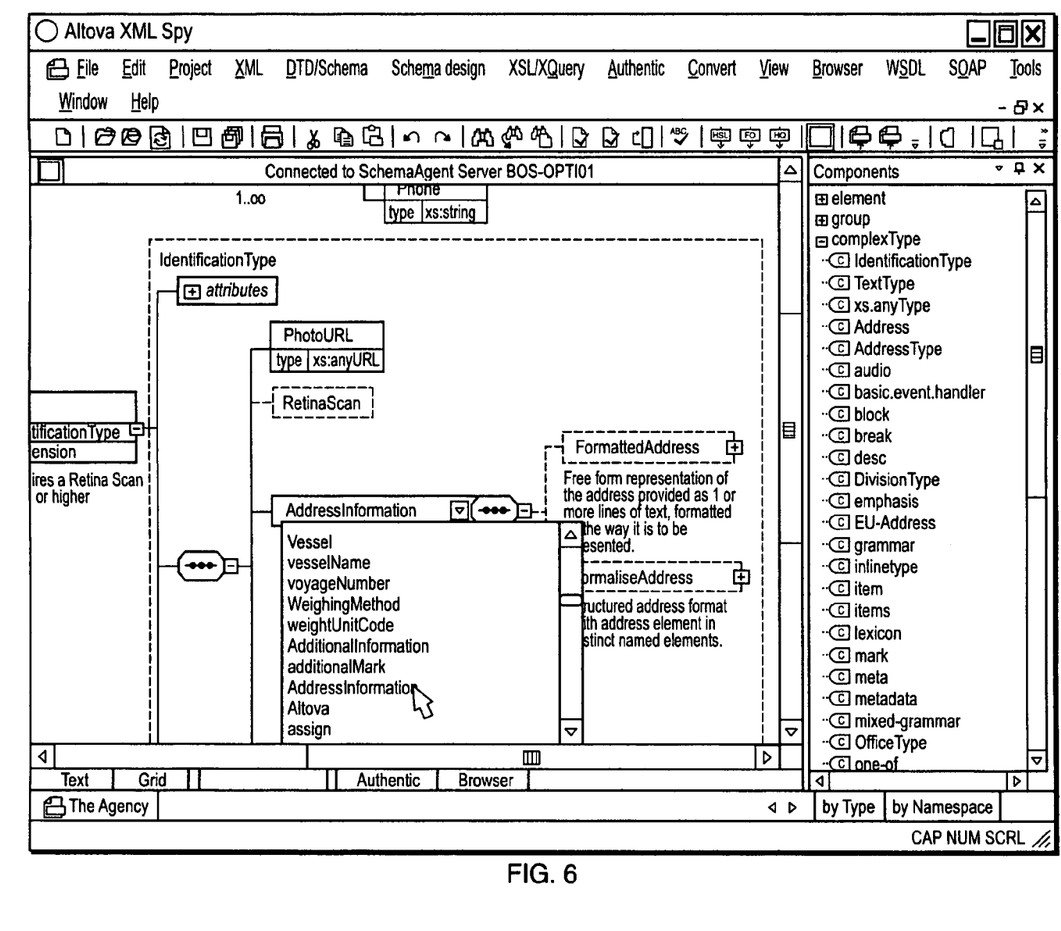
FIG. 6 illustrates how an XML editor may be used as a client component in the system.
Figure 7:
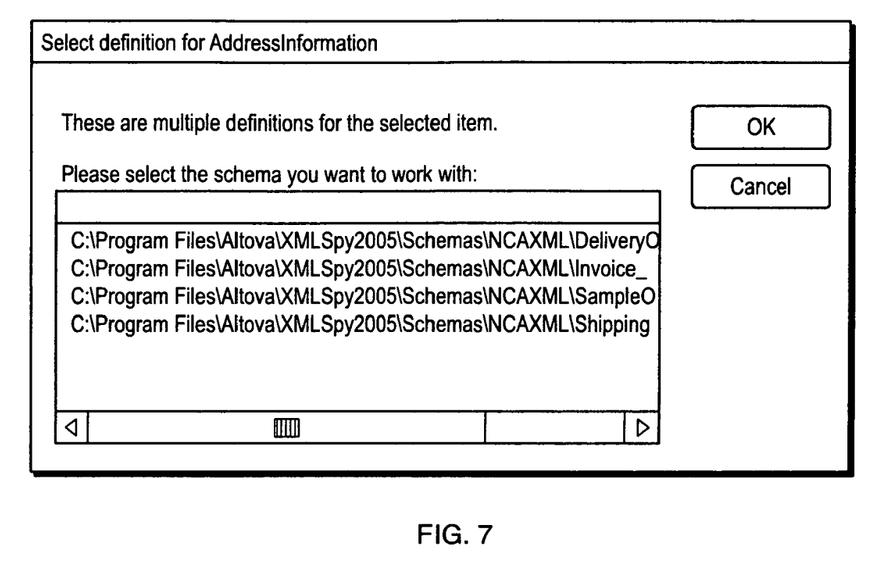
FIG. 7 illustrates a representative display from which a developer may select a given schema to receive a schema construct created by the XML editor.
Figure 8:
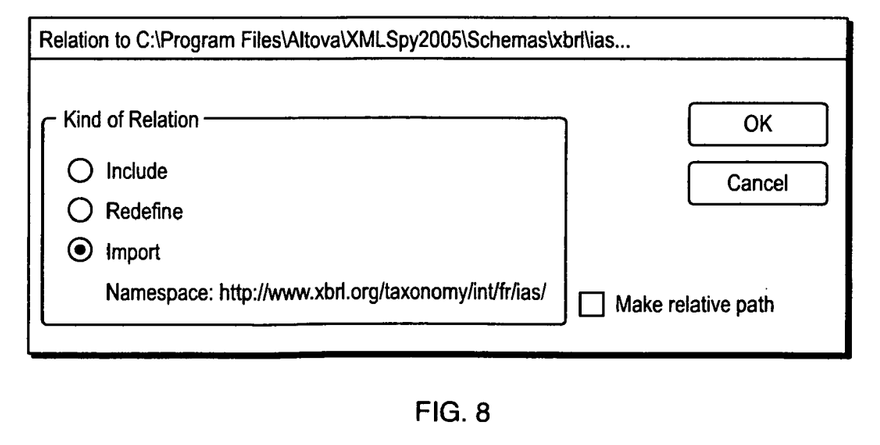
FIG. 8 illustrates a representative dialog panel from which a developer may create an IIR for the schema.

The ability to integrate a graphical schema design tool, such as XMLSpy® schema editor, with the server component provides another advantage. As noted above, using the schema editor (as the client component), the user can connect to the server and access an entire collection of schemas. By using the native editor functionality, such as shown in FIG. 6, the designer can insert schema "constructs" 600 into the schema. Thus, for example, using the editor tools (e.g., information windows, entry helpers, and the like) global elements can be dragged into a content model of a schema component 610, components 610 (such as complex types or simple types) can be selected from a list box 620 that automatically opens when defining new elements or attributes, or components 610 can be selected when creating or updating certain constructs 600. When the user inserts one of these components 610, he or she also can choose the schema that should include the definition required, e.g., using the list displayed in FIG. 7. Once a schema component and definition have been selected, the system prompts the developer to choose whether to automatically create the appropriate IIR statement. Depending on the context, certain of these options may not be available. FIG. 8 illustrates a representative dialog for this purpose. In addition to inserting the required include/import/redefine statement, the invention automatically propagates all changes made to the related schemas in the server path. The ability to integrate an XML editor with the server component greatly reduces the complexity associated with schema development and enables the efficient reuse of enterprise information assets. As the user inserts a new element into a schema, the editor can suggest a list of elements (e.g., that exist in other schemas in the collection); if the user selects one of those schemas, the server then generates the required import (or include or redefine) statements automatically.

Generalizing, changes made to schemas under server control, e.g., using an XML editor, automatically update any other schemas in the server path that referenced the changed schema.

The user can connect to the server by-after being presented with a search path for that server, or by selecting the server from a list of available servers (or search paths) in the enterprise. Preferably, the schemas are stored in a database associated with the selected server. The database may be supported in any commercial or open source product, such as Oracle, DB2, Postgres, or the like. In a representative embodiment, the server is Windows-based and is accessible as a Web service (i.e. SOAP over HTTP) by the one or more client components. As has been previously described, with schemas centrally (relative to the clients) stored and accessible, one or more clients can collaboratively access, edit, reuse, integrate and link them.

Generalizing, the server component of the present invention is used to assemble a collection of schemas, which can be done in a number of different ways. In one embodiment, the server assembles the collection by simply pointing to a file in a directory or folder located on a file server in the enterprise or on a local hard disk. In another embodiment, the server assembles the collection of schemas by connecting to one or more schema or document repository servers, such as via the WebDAV protocol. As noted above, the server then makes (preferably) the entire collection of schemas available to all client components that connect to the server. In the client software, the user can visualize the dependencies between schemas by dragging them into a workspace and seeing all related schemas and how they are connected, as well as what elements and other components they define. The client software also enables the user to visually define new relationships or to modify existing relationships, preferably by dropping and dragging connector lines between the schema representations. These changes are then propagated to the server, where the IIR relationships between the schemas are changed accordingly.

The present invention provides numerous advantages. Information architects and others in the enterprise use the visual tool as a development environment to model and manage complex XML schemas and their components. Using the client-server approach, the tool is available to an enterprise workgroup comprising a set of users. The server component connects one or more workgroup users to all of the XML schemas available in the enterprise, e.g., in an XML-enabled database, which promotes a collaborative environment on top of the schema repository. This enables developers to work together on schema development and to share modular schemas as standardized components for reuse in composite schema designs. In this way, the developers can manage and edit XML schema files collaboratively over a computer network using standard protocols, such as Web services. They can share their individual schemas across the enterprise and/or combine them into larger schemas that provide more sophisticated contextual data representations.

In an alternative embodiment, the client server paradigm described herein is useful in conjunction with the Web Services Definition Language (WSDL) files, XSLT and other stylesheets, XML and other data mappings, XQuery and other query languages, and any other files that relate to or use the XML Schemas or other data schemas. In this embodiment, the server is also used to define a collection of such other components, and the visual display of dependencies in the client is extended to show what other files use, import, or reference a given schema. In this way, the developer can see (e.g., in a more complete dependency tree displayed on the client GUI display pane) what parts of the enterprise information infrastructure depend on the given schema. In this embodiment, another variant would be to support re-factoring, so that changes made just to the given schema are also propagated to these dependent files.

Although the present invention has been described primarily in the context of modeling and managing XML Schemas, this is not a limitation of the present invention. By using one or more client components and at least one server component that exposes a collection of information datasets to each of the client components that are connectable to the server component, the present invention may also be used to model and/or manage other types of information architectures. These architectures include, without limitation, WSDL files, XSLT and other stylesheets, XML and other data mappings, XQuery and other query languages, other data schemas, combinations thereof, and the like.

While the above describes a particular order of operations performed by certain described embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Moreover, while the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs on a client or server on a standard Intel hardware platform running an operating system such as Windows.

While given components of the system have been described separately, one of ordinary skill will appreciate that some of the functions may be combined or shared in given instructions, program sequences, code portions, and the like.

In addition, the terms "client" and "server" should be construed generally. Thus, as used herein, a "client" should be broadly construed to mean any computer or component thereof directly or indirectly connected or connectable in any known or later-developed manner to a computer network. The term "server" should also be broadly construed to mean a computer, computer platform, an adjunct to a computer or platform, or any component thereof. Of course, a "client" should be broadly construed to mean an entity (system, machine, program, process, execution thread, or the like) that requests or gets a resource, object, file, document, piece of data, or the like, and "server" is the entity that provides it. A client and server may execute on a single machine to facilitate a standalone mode of operation. In such an embodiment, the client and server processes may communicate using any convenient protocol, such as named pipes.

As used herein, the term "interrelationship" or "relationship" should also be broadly construed to include a dependency between a given first and second schema.

Having thus described our invention, what we claim is set forth below.

The invention claimed is:

1. A system for managing Extensible Markup Language (XML) schemas across a distributed computing environment, wherein the XML schemas are stored or accessible from a data store, comprising:
   a set of one or more client components residing in a client having at least a memory and a processor; and
   at least one server component residing in a server having at least a memory and a processor that exposes a collection of XML schemas to each of the set of one or more client components that are connected to the server component;
   wherein at least one client component is adapted to generate a visual display of at least one interrelationship between a first XML schema and a second XML schema in the collection of XML schemas, the interrelationship comprising dependencies among XML schemas and all related XML schemas;
   wherein the at least one interrelationship between the first XML schema and the second XML schema is a textual reference to at least a part of the second XML schema;
   wherein at least one client component includes code executable in the processor to generate a display interface comprising a first portion and a second portion, the first portion displaying information identifying the collection of XML schemas and the second portion displaying at least one tab on which representations of the first and second XML schemas can be positioned.

2. The system as described in claim 1 wherein the client component includes code executable in the processor to display a representation of the collection of XML schemas and interrelationships between the XML schemas.

3. The system as described in claim 1 wherein the client component includes code executable in the processor to define a new relationship or to modify an existing relationship between the first XML schema and the second XML schema.

4. The system as described in claim 3 wherein the client component includes code executable in the processor to propagate to the server component information concerning the new relationship or the modified existing relationship.

5. The system as described in claim 4 wherein the server component includes code executable in a processor in response to receipt of the information concerning the new relationship or the modified existing relationship for updating at least one XML schema in the collection of XML schemas.

6. The system as described in claim 5 wherein the at least one XML schema in the collection of XML schemas is updated by one of:
an include statement,
an import statement, and
a redefine statement.

7. The system as described in claim 1 wherein the client component is connected to the server component via a network.

8. The system as described in claim 7 wherein the client component communicates with the server component via the network using a communications protocol.

9. The system as described in claim 1 wherein the client component is an XML editor.

10. An apparatus for use in managing a collection of XML schemas, wherein the XML schemas are accessible over a network from a server, comprising:
a processor;
code executable in the processor to generate an information display exposing the collection of XML schemas and their interrelationships to a set of clients connected to the server, the interrelationships comprising dependencies among XML schemas and all related XML schemas;
code executable in the processor to generate a modified information display, the modified information display responsive to an operation that creates a new or existing relationship between a first XML schema and a second XML schema; and
code executable in the processor in response to generation of the modified information display for communicating to the server information to update the collection of XML schemas automatically; and
code executable in the processor to display an interrelationship between a first XML schema and a second XML schema within the collection of XML schemas, wherein the interrelationship between the first XML schema and the second XML schema is a textual reference to at least a part of the second XML schema.

11. The apparatus as described in claim 10 wherein the modified information display is generated by altering at least one visual element on the information display.

12. The apparatus as described in claim 10 wherein the information display is a graphical user interface (GUI) that comprises a first portion and a second portion, the first portion displaying a list of XML schemas in the collection of XML schemas, and the second portion displaying an information architecture represented by at least the first XML schema and the second XML schema.

13. A method of creating and managing information architectures across a distributed computing environment, wherein the information architectures are stored or accessible from a data store, comprising:
exposing, from a server, a collection of information architectures, each information architecture consisting of at least one of an Extensible Markup Language (XML) schema, an Extensible Stylesheet Language Transformation (XSLT) stylesheet, an XML mapping, and a Web Services Description Language (WSDL) file, wherein the collection of information architectures are exposed to each of a set of clients that are connected to the server;
displaying, at a first client coupled to the server, an information display illustrating the collection of information architectures and their interrelationships, the interrelationships comprising dependencies among schemas and all related schemas, the information display comprising a graphical user interface (GUI) including a first portion and a second portion, the first portion displaying a list of information architectures;
displaying, at a second client coupled to the server, the information display;
in response to a modification to the information display at either the first client or the second client, propagating information concerning the modification to the information display to the server and updating the collection of information architectures accordingly; and
displaying an interrelationship between a first information architecture and a second information architecture within the information display;
wherein the interrelationship is a textual reference to at least a part of the second information architecture.

14. The method as described in claim 13 wherein the first client and the second client collaborate using the information display.

15. The method as described in claim 13 wherein the information display is a meta-schema that comprises a first XML schema created at the first client and a second XML schema created at the second client.

16. The method as described in claim 13 wherein the information architecture is a database schema.

* * * * *